Figure 1:
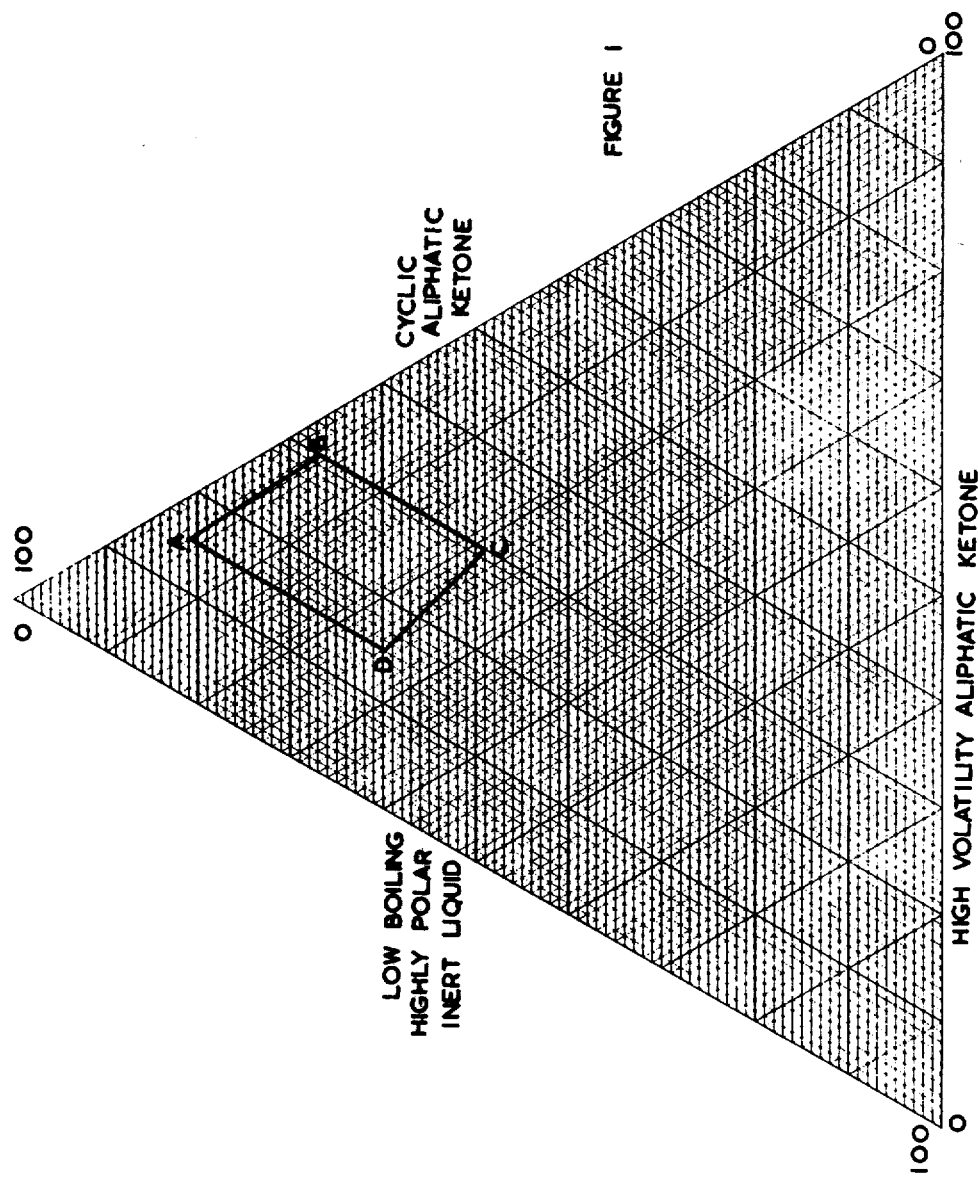

United States Patent [19]

Leslie

[11] 3,875,103

[45] Apr. 1, 1975

[54] POLYSULPHONE POLYMER SOLUTION

[75] Inventor: Victor Jeffrey Leslie, Potters Bar, England

[73] Assignee: Imperial Chemical Industries Limited, London, England

[22] Filed: Dec. 17, 1973

[21] Appl. No.: 425,277

[30] Foreign Application Priority Data
Jan. 26, 1973 United Kingdom ............... 4125/73
Jan. 26, 1973 United Kingdom ............... 4126/73

[52] U.S. Cl. ......... 260/30.8 DS, 106/311, 260/30.2, 260/30.8 R, 260/32.6 R, 260/32.8 R
[51] Int. Cl.... C08g 51/34, C08g 51/44, C08g 51/46
[58] Field of Search ... 260/30.8 R, 30.8 DS, 32.8 R, 260/49, 30.2, 32.6 R; 106/311

[56] References Cited
UNITED STATES PATENTS

| | | | |
|---|---|---|---|
| 3,418,277 | 12/1968 | Cohen | 260/49 |
| 3,647,751 | 3/1972 | Darsow | 260/30.2 |
| 3,657,177 | 4/1972 | Adesko | 260/30.4 R |
| 3,673,162 | 6/1972 | Buckley et al. | 260/30.2 |
| 3,723,389 | 3/1973 | Khattah | 260/49 |
| 3,773,720 | 11/1973 | Vogel | 260/30.2 |
| 3,819,582 | 6/1974 | Feasey | 260/32.6 R |

*Primary Examiner*—Allan Lieberman
*Attorney, Agent, or Firm*—Cushman, Darby & Cushman

[57] ABSTRACT

A solution for coating is provided comprising at least one thermoplastic amorphous aromatic polysulphone dissolved in a solvent mixture comprising 70 to 85% by volume of at least one cyclic aliphatic ketone and at least one low boiling highly polar inert liquid, the cyclic aliphatic ketone to low boiling highly polar inert liquid volume ratio being 70:30 to 95:5 and 30 to 15% by volume of at least one high volatility aliphatic ketone, the concentration of the polysulphone being 5 to 25 g in 100 cm$^3$ of solvent mixture.

10 Claims, 2 Drawing Figures

POLYSULPHONE POLYMER SOLUTION

This invention relates to polymer solutions and in particular to a solution for coating.

Thermoplastic amorphous aromatic polysulphones have high melting points and are therefore useful as coatings and adhesives to be used in environments where high temperatures are likely to arise. Coatings, adhesives and films are often prepared using solutions of polymers.

Solutions of thermoplastic amorphous aromatic polysulphones have hitherto suffered from instability leading to solutions having a short shelf-life. Such solvents are chlorinated hydrocarbons such as methylene chloride, chloroform, 1,1,2-trichloroethane, and 1,2-dichloroethane. Alternatively, solvents which give solutions of the polysulphones having long shelf life have high boiling points, and are therefore difficult to remove. Other solvents such as ketones are low stress cracking agents for polysulphones and can attack polysulphones to form highly viscous solutions, for example methyl ethyl ketone swells polysulphones to give only very concentrated solutions.

According to the present invention a solution for coating is provided comprising at least one thermoplastic amorphous aromatic polysulphone dissolved in a solvent mixture comprising 70 to 85% by volume of at least one cyclic aliphatic ketone and at least one low boiling highly polar inert liquid, the cyclic aliphatic ketone to low boiling highly polar inert liquid volume ratio being 70:30 to 95:5 and 30 to 15% by volume of at least one high volatility aliphatic ketone, the concentration of the polysulphone being 5 to 25 g in 100 cm³ of solvent mixture.

Thermoplastic amorphous aromatic polysulphones and methods for making them, are described in British Patent Specifications Nos. 1,016,245; 1,060,546; 1,078,234; 1,109,842; 1,122,192; 1,124,200; 1,133,561; 1,153,035; 1,153,528; 1,160,666; 1,177,183; 1,234,301; 1,255,588; 1,265,144; 1,295,584; 1,296,383; 1,298,821 and 1,303,252; Belgian Specification No. 741,965; Canadian Specification No. 847,963; U.S. Pat. No. 3,432,468; Netherlands Specifications No. 69, 03070; German Specification No. 1,938,806 and Swiss Specification No. 491,981, the disclosures of which are incorporated herein by reference.

The thermoplastic amorphous aromatic polysulphones described in the above mentioned specifications comprise repeating units of the formula —Ar—SO₂— in which Ar is a bivalent aromatic radical which may vary from unit to unit in the polymer chain (so as to form copolymers of various kinds). Thermoplastic amorphous aromatic polysulphones generally have at least some units of the structure

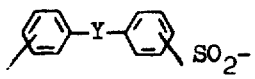

in which Y is oxygen or sulphur or the residue of an aromatic diol such as 4,4'-bisphenol. One example of such a polymer which is commercially available (Imperial Chemical Industries Limited) has repeating units of the formula

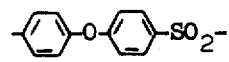

another has repeating units of the formula

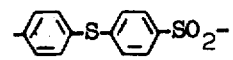

and others (which are also commercially available) are said to have repeating units of the formula

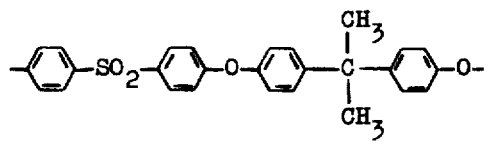

(Union Carbide Corporation) or copolymerised units in various proportions of the formulae

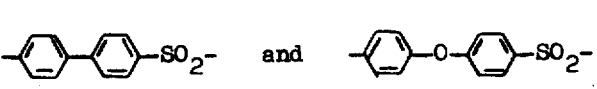

(Minnesota Mining and Manufacturing Company). Another group of such polymers has repeating units of the formula

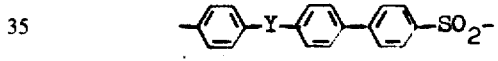

(where Y is oxygen or sulphur) which may be copolymerised with units of other formulae given above. Preferred such polymers have a reduced viscosity of at least 0.3 (as measured at 25°C on a solution of the polymer in dimethyl formamide containing 1 g of polymer in 100 cm³ of solution).

By the term "cyclic aliphatic ketone" is meant a cyclic ketone having a ring containing 5, 6 or 7 carbon atoms and a boiling point of less than 200°C at atmospheric pressure. Suitable cyclic aliphatic ketones include cyclopentanone, cyclohexanone, cycloheptanone and their alkyl, alkoxy derivatives provided that their boiling points is less than 200°C. Preferred cyclic aliphatic ketones are cyclopentanone and cyclohexanone.

By the term "low boiling highly polar inert liquid" is meant a liquid boiling at a temperature less than 210°C at atmospheric pressure and containing an —SO— (sulphoxide) or —SO₂— (sulphone) or

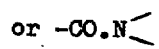

(amide) or

(amine)group. Suitable liquids include dialkyl sulphoxides and sulphones such as for example dimethyl sulphoxide, 1,1-dioxothiolan; substituted amides such as for example N,N-dimethyl formamide, N,N-diethyl formamide and N-methyl pyrrolidone; amines such as aniline and pyridine and piperidine.

By the term "high volatility aliphatic ketone" is meant a dialkyl ketone having boiling point less than 150°C at atmospheric pressure and not including a cyclic aliphatic ketone. Suitable ketones have the formula R.CO.R' where R and R' are alkyl radicals which may be substituted with inert groups provided that the boiling point is less than 150°C. Preferred such ketones are acetone and methyl ethyl ketone.

The composition range of solvent mixture according to the invention is defined by the area enclosed ABCD of the accompanying drawing FIG. 1.

A particularly preferred solvent mixture for optimum shelf life of the coating solution consists of cyclohexanone (15 to 20 parts by volume preferably about 18 parts), methyl ethyl ketone (4 to 7 parts preferably 5 parts) and dimethyl sulphoxide (1 to 3 parts preferably 2 parts).

By the term "amorphous" is meant amorphous to X-rays.

Polymer concentration in solvent mixture is within the range 5 to 20 g of polymer in 100 cm³ of solution, preferably 10 to 15 g of polymer; the lower the concentration of polymer the lower is the viscosity and the longer is the shelf life of the solution. The polymer may be dissolved in the solvent mixture merely by addition of polymer to the mixture but a preferred method is to dissolve polymer in a mixture of cyclic aliphatic ketone and low boiling highly polar inert liquid in the desired ratio at 70 to 95°C, preferably 75 to 85°C, and then after cooling to about 50°C to add the high volatility aliphatic ketone to that solution. The temperature of the polymer/cyclic ketone/inert liquid solution before addition of high volatility aliphatic ketone is not important but should for convenience be at least 20°C below the boiling point of the ketone.

The solutions of the invention may be used for casting films, impregnating, coating wire and other solid objects for insulation or protection and lacquering.

The solvents are removed by evaporation conveniently in an air circulating oven. A suitable procedure is to heat the coated article immediately after coating in an oven at 70 to 90°C for up to 2 hours and then raising the temperature to 160 to 200°C for 2 hours. However the exact conditions will depend on the thickness of the coating and the solvents used. It is preferred that the solvent evaporation stage is carried out in a dry atmosphere.

The invention is illustrated by the following example.

Thermoplastic amorphous aromatic polysulphone having repeating units of the formula

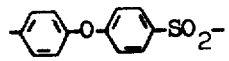

was made by the method of Example 3 of British Patent Specification No. 1,153,035. The polymer had a reduced viscosity of 0.45 as measured at 25°C on a solution of the polymer in dimethyl formamide containing 1 g of polymer in 100 cm³ of solution. The polymer was divided into two portions (a) and (b). Portion (a) had reactive end-groups removed by reaction with methyl chloride. Portion (b) contained hydroxyl end-groups to give a polymer particularly useful as an adhesive as described in Dutch Patent Application No. 71 08260 [i.e. a polymer whose number average molecular weight is sufficiently high to give a reduced viscosity of at least 0.3 (measured at 25°C on a solution in dimethyl formamide containing 1 g of polymer in 100 cm³ of solution) and which contains at least 0.2 aromatically bound hydroxyl groups per 100 polymer repeat units].

Figure 2:
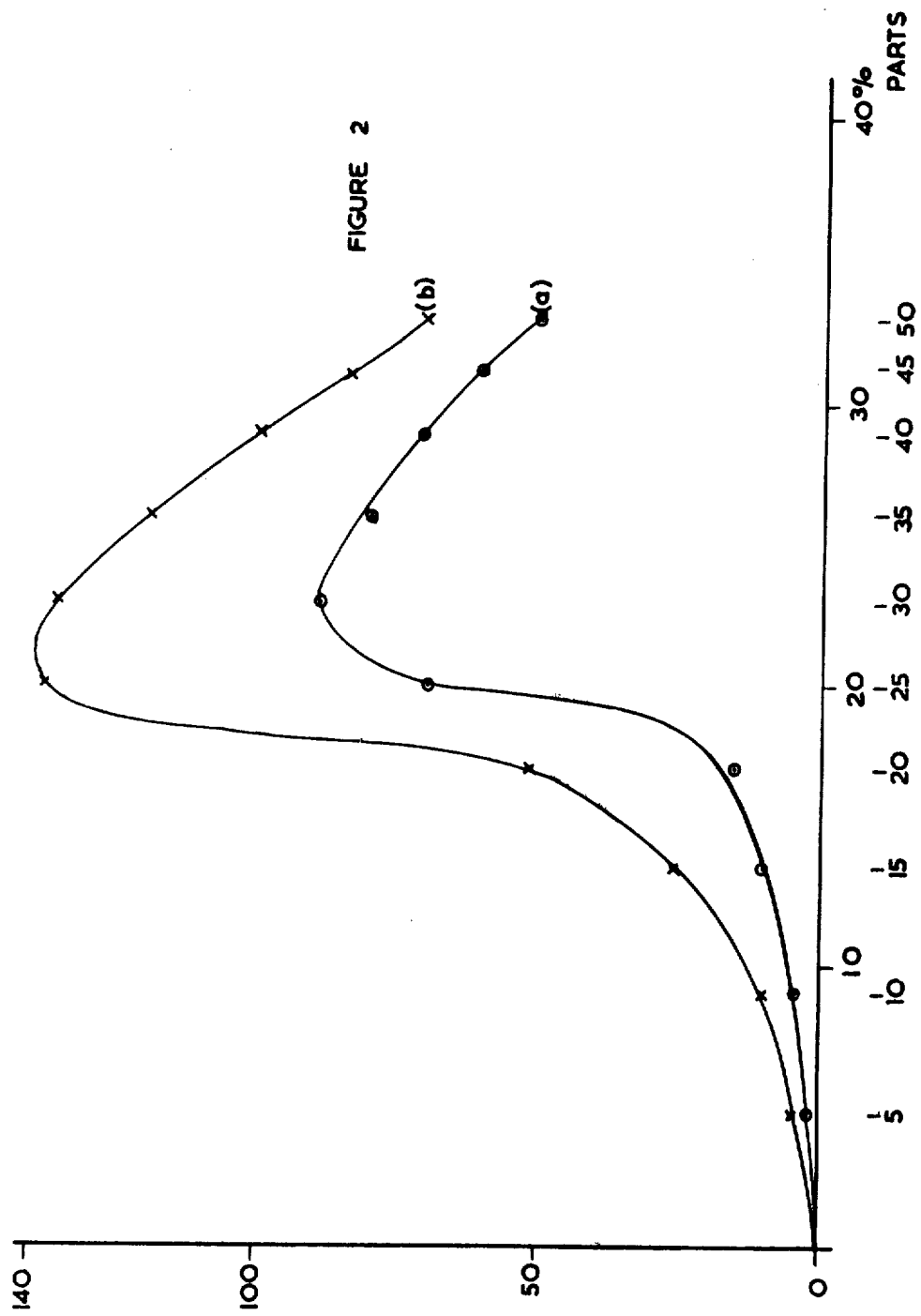

Solutions of the above polymers were prepared at 80°C in a mixture of cyclohexanone and dimethyl sulphoxide (ratio 90:10 by volume). The solutions contained 10 g polymer in 100 cm³ solution (i.e. 10% w/v). The solutions were cooled to 50°C, and divided into 11 portions of 100 cm³ each. To 10 portions of each solution, was added methyl ethyl ketone in amounts varying by 5 cm³ from 5 cm³ to 50 cm³. The resulting solutions were cooled to 20°C and shelf life recorded. Shelf life was estimated as the time (days) taken for the solution to show first signs of cloudiness, followed shortly by formation of a flocculent precipitate. The results of shelf life determination is shown in accompanying FIG. 2 in which the shelf life in days (ordinate) is plotted against volume (cm³) of methyl ethyl ketone in 10% w/v polymer in 100 cm³ of cyclohexanone/dimethyl sulphoxide (90:10 by volume) (abscissa). The graph shows that for both polymers, concentration of 17.5 to 43 parts of methyl ethyl ketone in 100 parts of polymer/cyclohexanone/dimethyl sulphoxide is most effective at increasing shelf life. On the graph, methyl ethyl ketone concentration in the solvent mixture is also expressed as a percentage (%). In these terms the most effective methyl ethyl ketone concentration is 15 to 30% by volume. Also the results show that the shelf life of a solution of polymer (b) having hydroxyl end-groups was longer than that of a solution of polymer (a) having reactive end-groups removed by methyl chloride.

I claim:

1. A solution for coating which comprises at least one thermoplastic amorphous aromatic polysulphone dissolved in a solvent mixture comprising (a) 70 to 85% by volume of a mixture of (i) at least one cyclic aliphatic ketone having a ring containing 5 to 7 carbon atoms and having a boiling point, at atmospheric pressure, of less than 200°C and (ii) at least one inert liquid compound containing a polar group selected from —SO—, —SO₂—, $$-CO.N\langle \text{ and } \rangle N-$$

groups and having a boiling point, at atmospheric pressure, of less than 210°C, the cyclic aliphatic ketone to inert liquid compound volume ratio being 70:30 to 95:5, and (b) 30 to 15% by volume of at least one dialkyl ketone having a boiling point, at atmospheric pressure, of less than 150°C, the concentration of the polysulphone being 5 to 25 g in 100 cm³ of solvent mixture.

2. A solution according to claim 1 in which the cyclic aliphatic ketone is selected from cyclopentanone and cyclohexanone.

3. A solution according to claim 1 in which the low inert liquid compound is selected from dimethyl sulphoxide and 1,1-dioxothiolan.

4. A solution according to claim 1 in which the dialkyl ketone is selected from acetone and methyl ethyl ketone.

5. A solution for coating which comprises at least one thermoplastic amorphous aromatic polysulphone dissolved in a solvent mixture comprising cyclohexanone (15 to 20 parts by volume), methyl ethyl ketone (4 to 7 parts by volume) and dimethyl sulphoxide (1 to 3 parts by volume), the concentration of polysulphone being 5 to 25 g in 100 cm³ of solvent mixture.

6. A solution according to claim 1 in which the concentration of polysulphone is 10 to 15 g in 100 cm³ of solvent mixture.

7. A solution according to claim 1 in which the thermoplastic aromatic polysulphone has at least some units of the structure

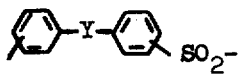

where Y is oxygen or sulphur or the residue of an aromatic diol.

8. A solution according to claim 7 in which the thermoplastic aromatic polysulphone has repeating units of the formula

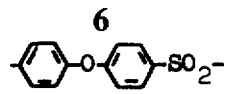

9. A solution according to claim 1 in which the thermoplastic aromatic polysulphone has a number average molecular weight sufficiently high to give a reduced viscosity of at least 0.3 (measured at 25°C on a solution in dimethyl formamide containing 1 g of polymer in 100 cm³ of solution) and contains at least 0.2 aromatically bound hydroxyl groups per 100 polymer repeat units.

10. A method of making a solution as claimed in claim 1 comprises dissolving the thermoplastic amorphous aromatic polysulphone in a mixture of the cyclic aliphatic ketone and the inert liquid compound in the desired ratio at 70°C to 95°C, cooling that solution to about 50°C and adding the dialkyl ketone to that cooled solution.

* * * * *